(12) United States Patent  
Tomizawa

(10) Patent No.: US 7,945,177 B2
(45) Date of Patent: May 17, 2011

(54) IMAGE FORMING APPARATUS WITH FIRST AND SECOND SETTABLE RESOLUTION GRADES

(75) Inventor: Takeshi Tomizawa, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 568 days.

(21) Appl. No.: 11/860,139

(22) Filed: Sep. 24, 2007

(65) Prior Publication Data

US 2008/0181647 A1 Jul. 31, 2008

(30) Foreign Application Priority Data

Sep. 29, 2006 (JP) .................................. 2006-268291

(51) Int. Cl.
G03G 15/00 (2006.01)
(52) U.S. Cl. .......................................... 399/45; 399/389
(58) Field of Classification Search .................... 399/45, 399/53, 389, 81
See application file for complete search history.

(56) References Cited

U.S. PATENT DOCUMENTS

| 6,327,450 | B1 | 12/2001 | Ito |
| 6,397,030 | B1 | 5/2002 | Watanabe |
| 6,473,583 | B2 | 10/2002 | Watanabe |
| 6,498,910 | B2 | 12/2002 | Haneda |
| 6,801,727 | B2 | 10/2004 | Maruyama |
| 7,110,686 | B2 * | 9/2006 | Toyohara ........................ 399/45 |
| 7,149,441 | B2 * | 12/2006 | Akita et al. ..................... 399/45 |
| 2002/0071688 | A1 * | 6/2002 | Maruyama ..................... 399/45 |
| 2003/0194252 | A1 * | 10/2003 | Nakamori ..................... 399/389 |
| 2005/0214004 | A1 * | 9/2005 | Toyohara et al. .............. 399/45 |
| 2006/0127113 | A1 * | 6/2006 | Sato ............................... 399/49 |

FOREIGN PATENT DOCUMENTS

| JP | 58-39468 A | 3/1983 |
| JP | 1-184764 A | 7/1989 |
| JP | 2000-231276 A | 8/2000 |
| JP | 2000-305339 A | 11/2000 |
| JP | 2000-347476 A | 12/2000 |
| JP | 2000-355443 A | 12/2000 |
| JP | 2001-92199 A | 4/2001 |
| JP | 2001-290319 A | 10/2001 |
| JP | 2003-302208 A | 10/2004 |
| JP | 2005-49523 A | 2/2005 |
| JP | 2005-62843 A | 3/2005 |

* cited by examiner

Primary Examiner — David M Gray
Assistant Examiner — Rodney Bonnette
(74) Attorney, Agent, or Firm — Fitzpatrick, Cella, Harper & Scinto

(57) ABSTRACT

An image forming apparatus includes an image bearing member and a toner image forming device forming a toner image on the image bearing member, using light toners, and dark toners which have a same hue as that of the light toners and are darker than the light toners. The apparatus forms images using first and second settable resolution grades.

3 Claims, 17 Drawing Sheets

RECORDING PAPER A

RECORDING PAPER B

RECORDING PAPER C

RECORDING PAPER A

RECORDING PAPER B

RECORDING PAPER C

FIG. 8

$$\begin{pmatrix} Ro \\ Go \\ Bo \end{pmatrix} = \begin{pmatrix} a11 & a12 & a13 \\ a21 & a22 & a23 \\ a31 & a32 & a33 \end{pmatrix} \begin{pmatrix} Ri \\ Gi \\ Bi \end{pmatrix}$$

WHERE  Ro、Go、Bo  OUTPUT IMAGE SIGNAL
       Ri、Gi、Bi   INPUT IMAGE SIGNAL

CONCEPTUAL ILLUSTRATION OF RECORDING MATERIAL

IMAGE FORMING APPARATUS WITH FIRST AND SECOND SETTABLE RESOLUTION GRADES

BACKGROUND OF THE INVENTION

1. Field of the Invention

The present invention relates to an electrographic image forming apparatus (hereinafter, simply called an "image forming apparatus), such as a copying machine, a printer, facsimile terminal equipment, and a multifunction printer, which forms images using an electrophotographic system. Especially, the present invention relates to an electrophotographic image forming apparatus using dark toners and light toners, which have a same hue, but are different from each other in density.

2. Description of the Related Art

The image forming apparatus forming color images forms four color toner images on, for example, a photosensitive drum of an image bearing member, wherein the four colors include Y (yellow), M (magenta), C (cyan), and K (black). The above-mentioned toner images are sequentially superimposed and transferred on, for example, a sheet (transfer material) held on a transfer drum (transfer film). In the above-mentioned case, an electrostatic latent image of, for example, cyan as a first color is formed on a photosensitive drum, based on input signals including read image information, and then a C toner image obtained by developing the cyan latent image is transferred on a sheet on the transfer drum. The above-mentioned series of transfer processes are sequentially repeated for other three colors of Y toners, M toners, and K toners as a second color, a third color, and a fourth color in this order, thereby a color image is obtained.

Recently, latent images are collected and formed on the drum surface of the photosensitive drum, wherein the drum surface bears dots of a predetermined potential, and a solid portion, a half-tone portion, and a line portion are expressed by changing the density of the dots in the image forming apparatus using digital image signals. However, in the above-mentioned case, toner particles are hardly placed on the dots, and there is caused a state in which the toner particles deviate from the dots. Thereby, it is difficult to obtain the gradations of a toner image corresponding to the dot density ratio between the black portions and the white portions of a digital latent image. Moreover, when resolution is improved by smaller dots in order to improve image quality, it becomes more difficult to reproduce a latent image formed by a collection of microdots. Especially, the resolution and the gradations in highlight portions are deteriorated to cause a tendency to lose sharpness in the color of the image. Moreover, disturbance of the dots causes a sense of granularity which leads to reduction in the image quality for the highlight portions, and image unevenness by the granularity is an unpredictable unstable element of the image quality.

On the other hand, an inkjet recording method is a simple system as can be seen in a technology processing dark-colored ink and light-colored ink, which has been disclosed in, for example, Japanese Patent Application Laid-Open No. 58-039468. Moreover, the inkjet recording method has been supported by use of recent and excellent high-quality specialized-paper and does not cause the above-described problems raised by the electrophotographic system. Furthermore, the inkjet recording method has a unique advantage that there is caused no sense of granularity, because the method used dark-colored ink and light-colored ink. As excellent performances are obtained by use of, especially, light-colored ink, an electrophotographic system applying light-colored ink would result in a largely improved system.

Furthermore, even with regard to optical dot gain which is a barrier for developing an electrophotographic system forming a high-quality image, an idea of introducing light-colored toners is effective for solving the problems caused by use of micro toners. Based on the above idea, there has been proposed an image forming apparatus (refer to, for example, Japanese Patent Application Laid-Open Nos. 11-84764 and 2000-305339) forming an image by combining a plurality of toners which are different from one another in density, for example, by using light-colored toners (light toners) in the highlight portions, and dark-colored toners (dark toners) in solid portions. Moreover, there has been proposed an image forming apparatus (refer to, for example, Japanese Patent Application Laid-Open No. 2000-347476) in which dark toners and light toners having a maximum reflection density below half of the maximum reflection density of each of the dark toners are combined. Moreover, there has been proposed an image forming apparatus (refer to, for example, Japanese Patent Application Laid-Open No. 2000-231276) having a configuration in which dark toners with an image density of 1.0 or more and light toners with an image density less than 1.0 are combined, when toner quantity on a sheet is 0.5 $mg/cm^2$. Furthermore, there has been proposed an image forming apparatus (refer to, for example, Japanese Patent Application Laid-Open No. 2001-290319) in which toners are combined so that a recording density ratio between the dark toner and the light toner is adjusted at 0.2 through 0.5.

In the image forming apparatuses disclosed in the above-described patent documents, it has been assumed that plain paper is mainly used as a kind for a sheet as the transfer material. As described above, the inkjet recording method has realized a high-level image forming technology by using high-quality specialized paper with excellent printing performances based on stable high-resolution binary recording. It is very difficult to introduce the image forming technology as it is based on the above-described inkjet recording method into the electrophotographic system which has mainly used plain paper. Conventionally, the electrophotographic system has improved density gradations by using a low resolution screen which has been used for printing, in order to reduce a performance difference between high quality specialized paper and plain paper. Thereby, problems, such as coarseness and granularity, peculiar to the electrophotographic system may be solved by using light toners in low density portions.

Incidentally, greater importance is often placed on smoothness in highlight portions as an image using dark toners and light toners when the quality of an image like a picture is improved.

However, toner quantity placed in highlight portions is increased as a result of smoothing the highlight portions. Moreover, when a toner image is formed on a sheet (recording material) with a rough surface, transfer unevenness of light toners in highlight portions is easily caused in a toner image with an increased quantity of toner.

SUMMARY OF THE INVENTION

An object of the invention is to provide an image forming apparatus using dark toners and light toners, which have a same hue, and are different from each other in density, wherein, according to the image forming apparatus, a high-quality image may be formed, independent from the surface roughness of a recording material.

Moreover, another object is to provide an image forming apparatus including: an image bearing member; a toner image forming means forming a toner image on the image bearing member, using light toners, and dark toners which have a same hue as that of the light toners and are darker than the light toners; a transfer means which electrostatically transfers a toner image on the image bearing member onto a recording material; and an adjusting means which adjusts the toner image forming means so that a rate between the dark toners and the light toners included in a toner image with predetermined density on the image bearing member is changed according to the roughness of a surface onto which the toner image on the recording member is transferred.

BRIEF DESCRIPTION OF THE DRAWINGS

FIG. 8 is a matrix of three basic elementary colors RGB;

DESCRIPTION OF THE EMBODIMENTS

Hereinafter, an electrophotographic full-color image forming apparatus, and an image adjusting method will be described as an image forming apparatus according to an exemplary embodiment of the invention in detail, referring to drawings.

Figure 1:
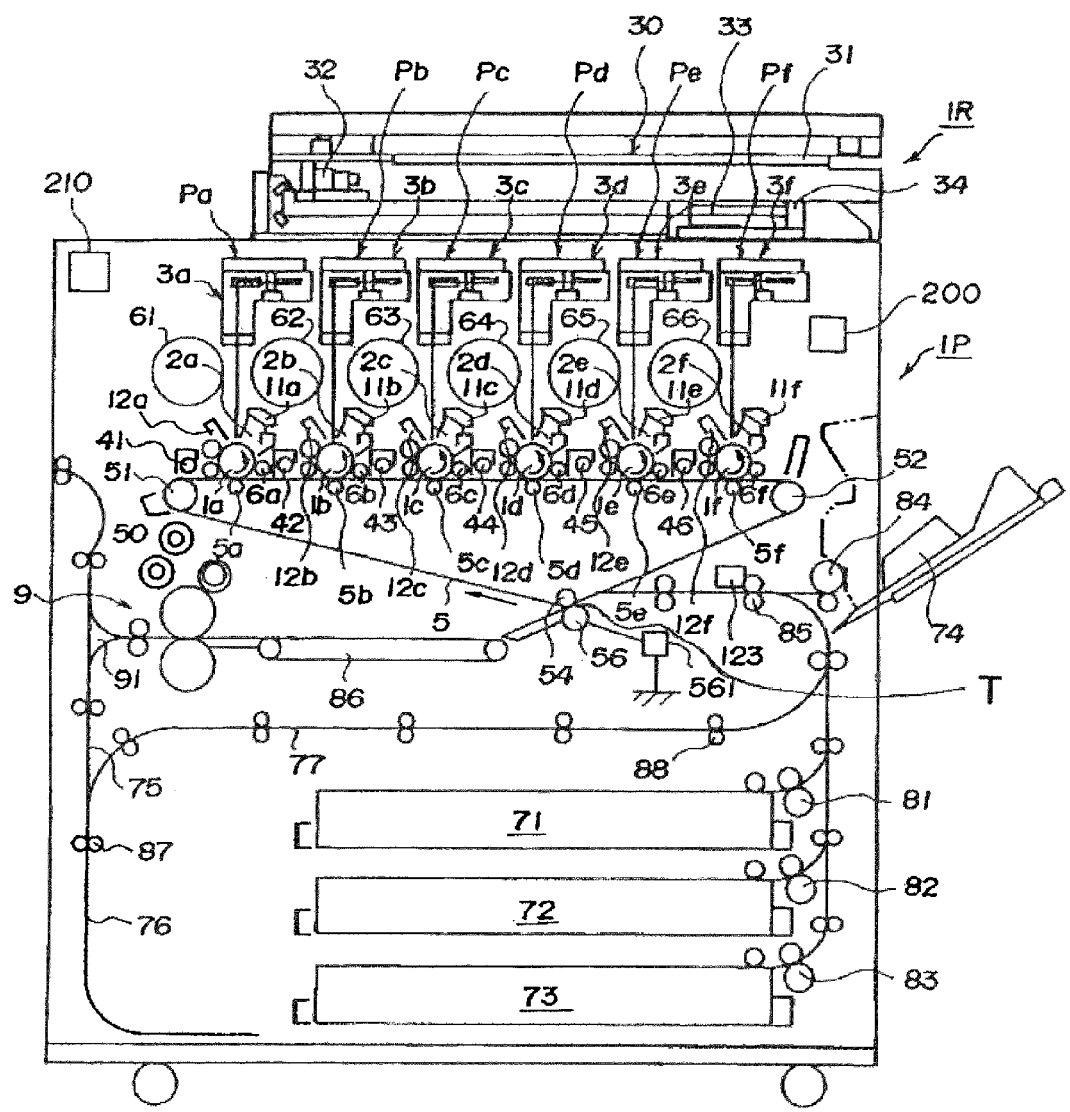
FIG. 1 is a view showing an image forming apparatus according to an embodiment of the invention.

As shown in FIG. 1, the electrophotographic full-color image forming apparatus according to the present embodiment has a digital color image reading portion (hereinafter, simply called "reading portion") 1R in the upper portion, and a digital color image printing portion (hereinafter, simply called "printing portion") 1P in the lower portion. In the above-described case, the printing portion 1P may operate based on a read signal output from the reading portion 1R.

In the reading portion 1R, the light of an exposure lamp 32 is applied for exposure scanning to an original sheet 30 mounted on an original base plate glass 31, and a light image reflected from the original sheet 30 is focused onto a full-color CCD sensor 34 through a lens 33 to obtain color-separated color image signals. The color-separated color image signals pass through a not-shown amplification circuit for image processing in a video processing means, and are sent to the printing portion 1P through an image memory. An image signal from a computer, an image signal based on facsimile communication, and the like are input to the printing portion 1P as well as the read signal of an image which is output from the reading portion 1R are input to the printing portion 1P.

In the printing portion 1P, for example, six photosensitive drums 1a through 1f as an image bearing member are supported in the directions of arrows shown in the drawing. Hereinafter, the six photosensitive drums 1a through 1f are collectively represented by a reference numeral "1"; pre-exposure lamps 11a-11f are collectively represented by reference numeral "11"; corona primary charges 2a-2f are collectively represented by reference numeral "2"; laser exposure optical systems 3a-3f are collectively represented by reference numeral "3"; potential sensors 12a-12f are collectively represented by reference numeral "12"; development devices 41-46 loading toners which are different from one another in spectral characteristics, transfer devices 5a-5f are collectively represented by reference numeral 5; and cleaning devices 6a-6f are collectively represented by reference numeral 6 are arranged around photosensitive drums 1a-1f. While the above-described devices form six image forming portions (toner image forming means) Pa through Pf, obviously, the number of the portions is not limited to six but image forming portions of an arbitrary number of four or more may be provided.

Incidentally, a light-colored magenta (LM) toner is loaded in a development device 41 as one of the six development devices 41-46 and a light-colored cyan (LC) toner is loaded in a development device 42. Furthermore, there are loaded a yellow (Y) toner in a development device 43, a magenta (M) toner in a development device 44, a cyan (C) toner in a development device 45, and a black (K) toner in a development device 46. Each of the above toners is charged negative polarity in the corresponding development device.

In order to reduce the granularity, the magenta (M) toner loaded in the development device 44 uses a dark-colored M toner (hereinafter, called "dark toner") and a light-colored M toner (hereinafter, called "light toner"). Similarly, a dark toner and a light toner are also used for the cyan (C) toner loaded in the development device 45.

The dark magenta toner and the light magenta toner are simultaneously used in one image, and the dark magenta toner and the light dark magenta toner are superimposed in the same pixel forming the image. The same holds true for the dark and the light cyan toners.

Furthermore, it is also possible to provide an image forming portion having a development device loading toners of metal such as gold and silver, or toners including a fluorescent agent. Moreover, technical ideas of the invention are achieved even when a single-component developing agent including only toner is used, though a two-component developing agent using a combination of toners and carriers is loaded in one of the development devices 41-46.

Moreover, a laser (unshown) output portion converts the read image signal output from the reading portion 1R into an optical signal, and laser light converted into the optical signal is reflected on a polygon mirror in the scanner 3 in the laser exposure optical system. Reflected laser light is fully projected onto the drum surfaces of the six photosensitive drums 1 through the lens and the reflection mirrors.

According to the above-described configuration, images are formed as follows in the printing portion 1P.

The photosensitive drum 1 is rotated in the direction of the arrow, and the photosensitive drum 1 after dielectrification by the pre-exposure lamp 11 is uniformly charged by the primary charger 2 to form an electrostatic latent image on the photosensitive drum 1 by exposure for each of separated colors.

Subsequently, the development device 40 is operated to develop a latent image on the photosensitive drum 1, and a visible image (toner image) including resins and pigments as a base body is formed on the photosensitive drum 1. The toners in the development device 40 are supplied from accommodation portions (hoppers) 60 for each color which are adjacent to the corresponding scanner 3 at any desired timing, so that the toner ratios (or toner quantities) in the development device 40 are kept constant. In each of the transfer devices 5, the toner images formed on the photosensitive drums 1 are primarily transferred onto a corresponding intermediate transfer belt 5 as an intermediate transfer body, and each of the toner images are sequentially superimposed on the above transfer belt 5.

The intermediate transfer belt (the image bearing member, the intermediate transfer body) 5 is wound around a driving roller 51, and driven rollers 52 and 54, and transmits rotary power from a rotary driving source to the driving roller 51. The driving roller 51 is rotationally driven to cause rotational travelling of the intermediate transfer belt 5. A transfer cleaning device 50 is arranged in a side opposite to the driving roller 51 with the intermediate transfer belt 5 existing therebetween. Moreover, the transfer cleaning device 50 can be contacted with and separated from the driving roller 51. The transfer cleaning device 50 is pressed onto the driving roller 51 after superimposing images for required colors on the intermediate transfer belt 5, and then remaining toners on the intermediate transfer belt 5 are cleaned and removed after toner images are transferred onto a sheet as a transfer material (recording material).

Sheets are conveyed one-by-one from a storage portion, i.e., paper cassette, 71, 72, or 73, or a manual paper feed portion 74 through a corresponding one of paper feed means, paper feeding rollers 81 through 84. A sheet the skew of which is corrected by a registration roller 85 is sent to a secondary transfer portion T at desired timing, a voltage of positive polarity is applied to a secondary transfer roller (transfer means) 56 from a transfer power supply 561, and a toner image on the intermediate transfer belt 5 is transferred to the sheet. The sheet on which the toner image has been transferred in the secondary transfer portion 56 passes through a conveying portion 86, the toner image is fixed on the sheet at a heat-roller fixing device 9, and the sheet is ejected to an output tray or a postprocessing device. On the other hand, remaining toners after transferring are cleaned by the transfer cleaning device 50 after secondary transferring, and then the intermediate transfer belt 5 serves for primary transfer processing again in the image forming portions.

Moreover, when an image is formed on both sides of a sheet, that is, in the case of double-sided printing, a conveying-path guide 91 is driven just after the sheet passes through the fixing device 9. Once the sheet is led to a reversing passing 76 through a conveying path 75, a reversing roller 87 is reversely rotated and the sheet is receded in an opposite direction to the direction the sheet has been sent in a state in which the rear end of the sent sheet is at the head, and then the sheet is sent to a double-sided conveying path 77. The sheet passing through the double-sided conveying path 77 undergoes skew correction and timing adjustment by a double-sided conveying roller 88, and is conveyed to the registration roller 85 at desired timing. Subsequently, the above-described image forming process is executed again for image transferring onto one side.

Then, image forming in each of image forming modes will be described.

As described above, dark toners and light toners, which have a same hue, are prepared for magenta (M) toners and cyan (C) toners. Materials which have a same hue means color developing components (pigments) having a same spectral characteristic as one another. But, the word "same" does not always require strict identity, and is generally allowed to include a range within which colors may be regarded as a same color as one another according to a usual concept on, for example, four colors such as Y, M, C, and K. Moreover, toners which are belonging to a same hue and have different densities from one another usually means toners in which color developing components (pigments) included in the toners having resins and the color developing components as a base body are the same as one another in the spectral characteristic and the quantity is different from one another.

Hereinafter, a light toner will be defined. The light toners are defined to belong to a same hue, and to be a toner with relatively low density among a combination of several kinds of toners with different densities from one another. In the present embodiment, light-colored light toners with low density have an optical density less than 1.0 after fixing for a toner quantity of 0.5 mg/cm$^2$ on a sheet. On the other hand, dark-colored dark toners with high density have an optical density of 1.0 or more after fixing for a toner quantity of 0.5 mg/cm$^2$ on a sheet. In such a case, the pigment quantity of a dark toner is adjusted so that optical density after fixing is 1.6 at a placed toner quantity of 0.5 mg/cm$^2$ on a sheet. Moreover, a light toner is designed so that optical density after fixing is 0.8 at a placed toner quantity of 0.5 mg/cm$^2$. Thus, two kinds of dark toners and light toners are appropriately mixed in quantity for magenta and cyan to obtain important tone reproduction as a target for cyan and magenta.

Figure 2:
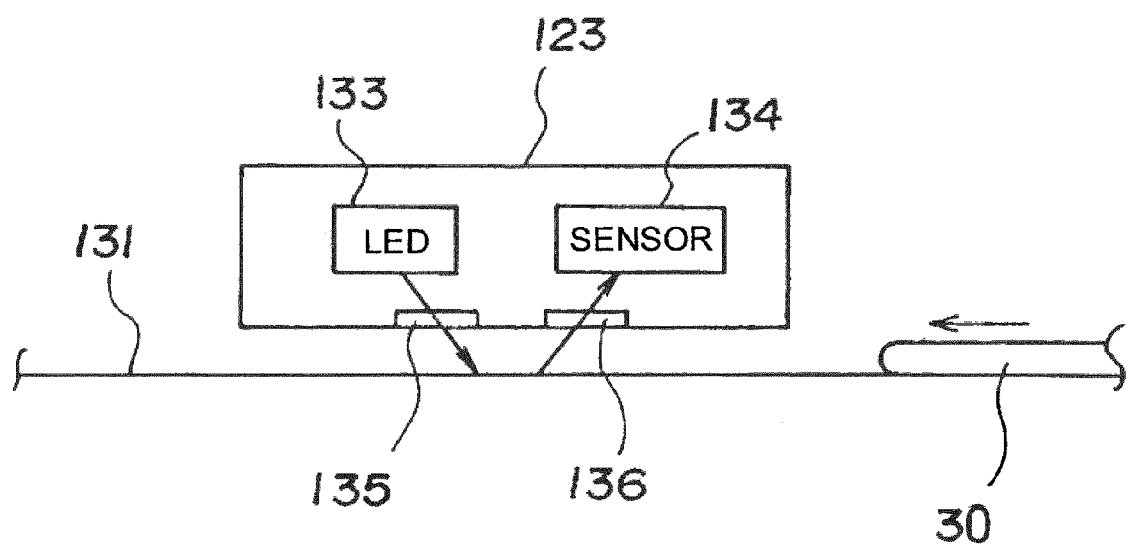
FIG. 2 is a view showing a structure of an image reading and detecting portion.

As shown in FIG. 2, a sheet reading and detecting portion (recording material detecting means) 123 is provided in the full-color image forming apparatus according to the present embodiment. In the sheet reading and detecting portion 123, light is applied onto the surface of a sheet 30 conveyed from a paper cassette by a paper feeding roller not shown and reflected light is focused for image forming to detect a specific area in the sheet 30. The sheet reading and detecting portion 123 has an LED 133 as a light applying means, a CMOS sensor 134 as a reading means, lenses 135 and 136 as an image forming means, and the like.

Accordingly, light emitted from the LED 133 as a light source is applied onto the surface of the sheet conveying guide 131, or the surface of the sheet 30 on the sheet conveying guide 131 through the lens 35. Reflected light from the sheet 30 is focused through the lens 36 to form an image in the CMOS sensor 134. The image formed above is detected by the CMOS sensor 134 to read the surface of the sheet conveying guide 131 or the sheet 30. Here, light from the LED 133 is arranged so that the light is applied at a predetermined angle with respect to the surface of the sheet 30 in a slanting direction.

Figure 3A:
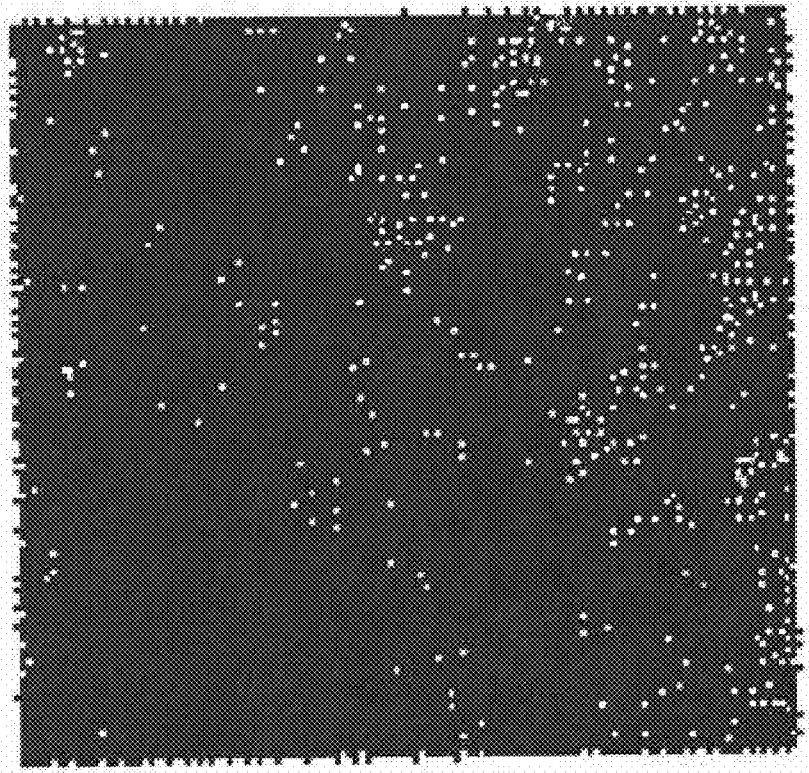
FIG. 3A is a schematic view showing an image formed on recording paper A as an example of sheet types according to a first embodiment.
Figure 3B:
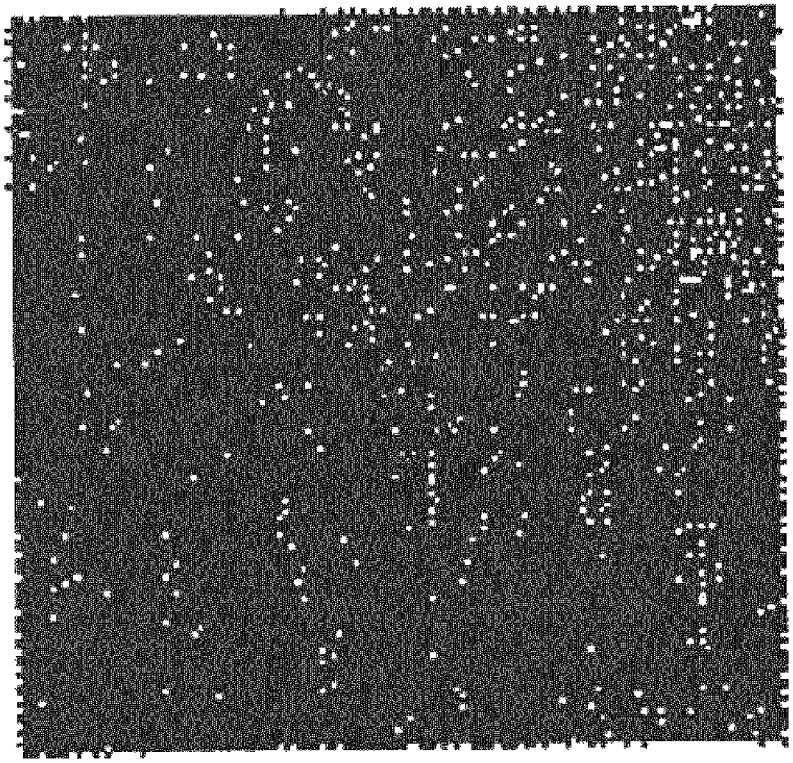
FIG. 3B is a schematic view showing an image formed on recording paper B as an example of sheet types according to a first embodiment.
Figure 3C:
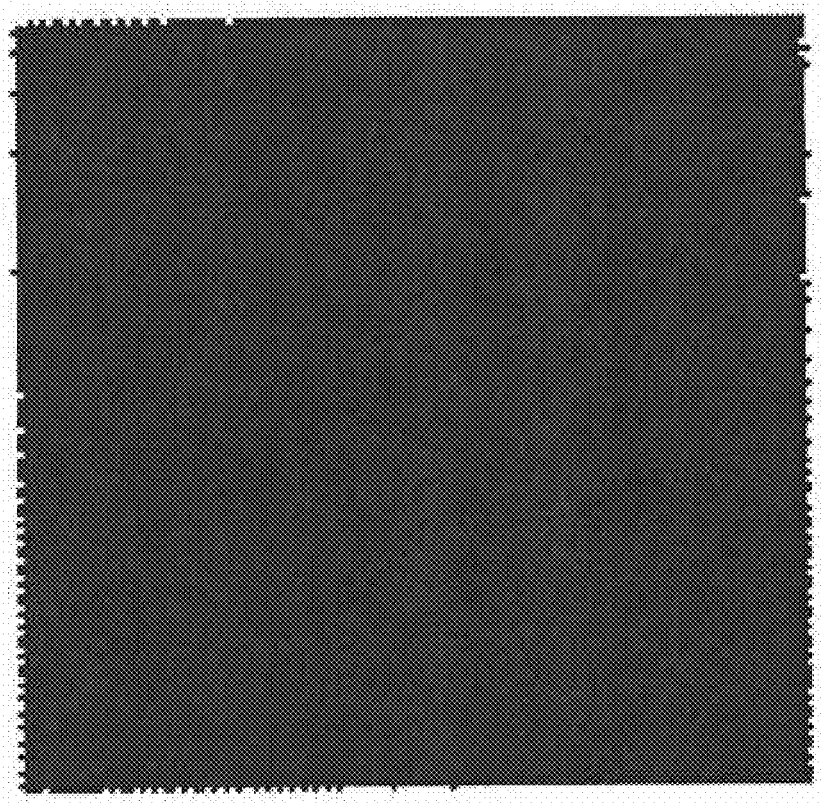
FIG. 3C is a schematic view showing an image formed on recording paper C as an example of sheet types according to a first embodiment.

FIG. 3A through FIG. 3C are views showing an example in which the surfaces of three kinds of sheets 30 (hereinafter, called "recording paper A, B, and C") are read by the CMOS sensor 134 in the sheet reading and detecting portion 123 to perform digital processing of the output from the CMOS sensor 134 for the surface of each of the recording paper A, B, and C in 8 pixels×8 pixels. The above digital processing is performed by conversion of an analog output from the CMOS sensor 134 into pixel data of eight bits, using a not-shown analog-to-digital converter as a converting means.

Figure 4A:
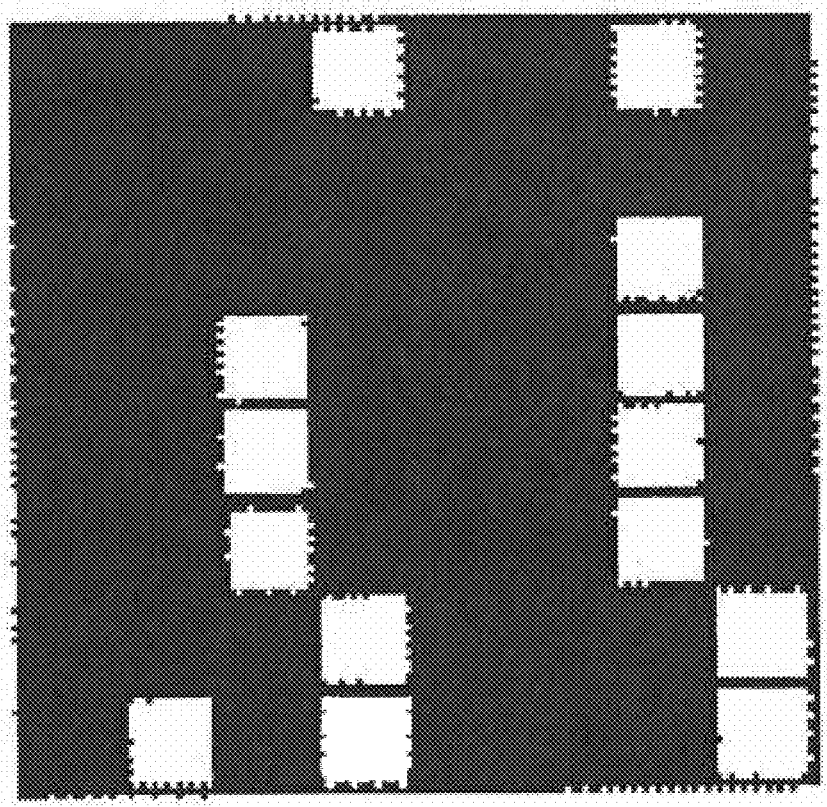
FIG. 4A is a schematic view showing an image formed on the recording paper A after pixel data conversion.
Figure 4B:
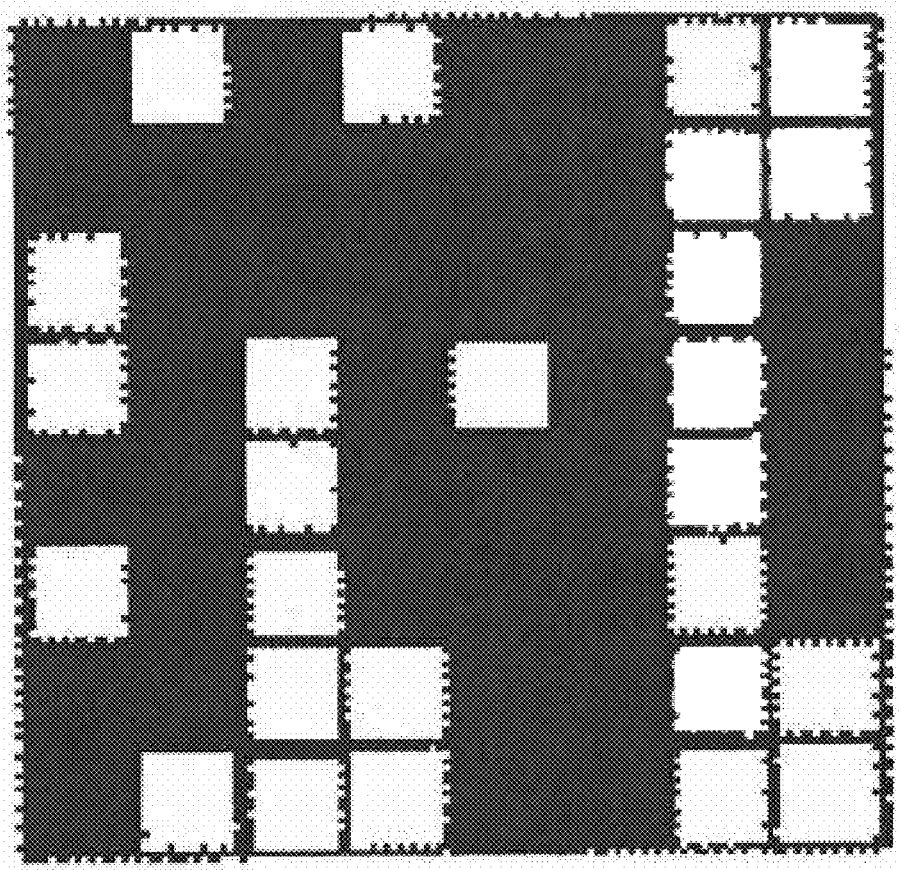
FIG. 4B is a schematic view showing an image formed on the recording paper B after pixel data conversion.
Figure 4C:
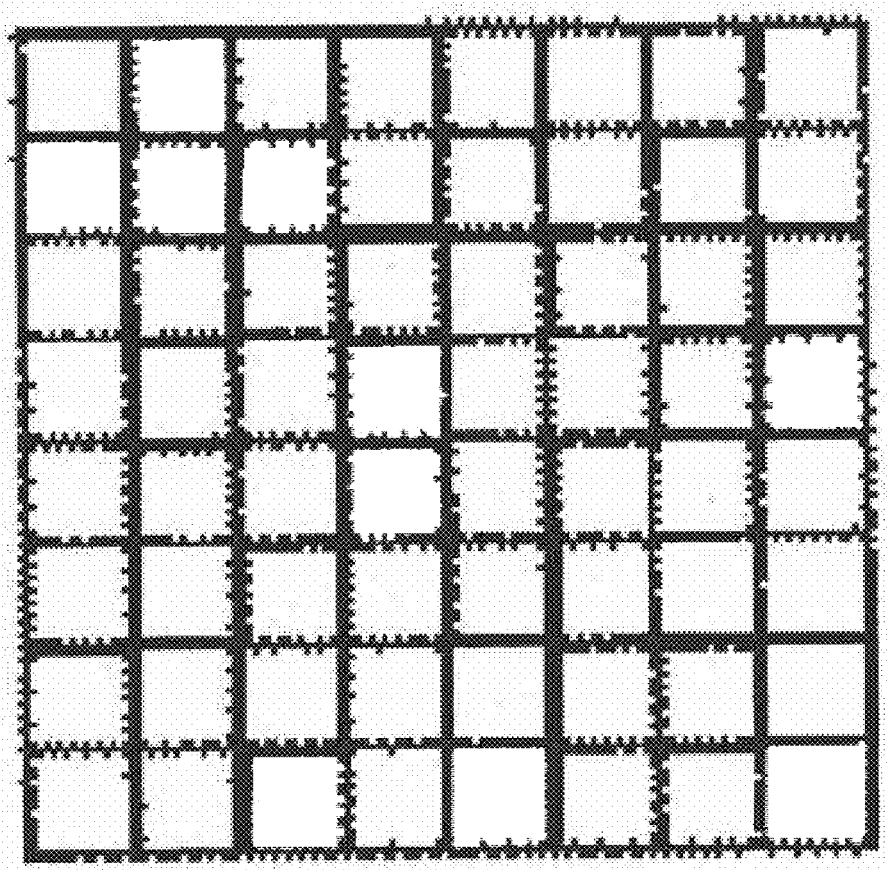
FIG. 4C is a schematic view showing an image formed on the recording paper C after pixel data conversion.

FIG. 3A is a schematic view showing the surface of the recording paper A, such as so-called rough paper, having relatively coarse cellulose on the sheet surface. Similarly, FIG. 3B is a schematic view showing the surface of the recording paper B, such as so-called plain paper, which has been usually used. Furthermore, FIG. 3C is a schematic view showing the surface of the recording paper C, such as smooth paper (gloss paper), having fully compressed cellulose. Pictures shown in FIG. 4A through FIG. 4C, respectively, are obtained by digital processing of each of the pictures on the corresponding surface read by detection using the CMOS sensor 134. As shown in the drawing, the pictures obtained by reading the surfaces are different from one another, depending on the materials and the kinds of the sheets, such as the recording papers A, B, and C. Those phenomena are caused by a fact that the cellulose states on the paper surface are different from one another. That is, a decision of the surface state of paper cellulose may be made by a picture obtained by digital processing based on a detection made by the CMOS sensor 134.

Reading operations for the surfaces of the recording paper A, B, and C will be described, referring to a flow diagram shown in FIG. 5.

In the first place, the CMOS sensor 134 reads the surface at several locations on the sheet 30, that is, the recording paper A, B, and C over several times at steps S50 and S51. Subsequently, constants for gain operation and filter operation in a not-shown filter operation means are adjusted (step S53) after turning off the LED (step S52). The gain operation and the filter operation are programmably processed by a control processor. The gain operation is performed by adjusting, for example, the gain of an analog output from the CMOS sensor 134. That is, as the surface of a sheet may not be read well when the quantity of light reflected on the sheet surface is too much or too little, the gain is adjusted when a signal change may not be led. Moreover, with regard to the filter operation, operations based on, for example, a 1/32 frequency division, a 1/16 frequency division, and a 1/4 frequency division are performed to remove a noise component output from the CMOS sensor 134 when, for example, digital data of 256 gradations by eight bits is obtained after analog to digital conversion of an analog output from the CMOS sensor 134.

Then, it is determined (step S54) whether adjustment of the above-described filter and the above-described gain has been completed to the extent that it is possible to decide that a sheet is corresponding to which of the recording materials A, B, and C.

When it is determined that the adjustment of the filter and the gain is completed to the extent that it is possible to decide the type of the recording material for the sheet (Yes), comparison operation of surface information is performed (step S55). When it is determined that it is not adjusted to the extent that it is possible to decide the type of the recording material for the sheet (No), reading of the surface of the sheet is tried again, returning to the step S51. A sheet kind is decided, based on the result of the above surface-information comparison operation (step S56), and then there is decided an image processing method according to the surface roughness of the sheet (step S57).

According to a technique for the surface-information comparison operation, pixel highest density Dmax, and a pixel lowest density Dmin are led from a result obtained by reading the sheet surface at several regions. The above-described operations are executed for each of read regions to perform averaging processing of the obtained pixels. On a sheet like the recording paper A shown in FIG. 3 and FIG. 4, a lot of shadows of cellulose are generated when there are coarse paper cellulose on the sheet surface. Thereby, there is caused a greater density difference between a bright location and a dark location to make the difference between highest pixel density Dmax and lowest pixel density Dmin greater. Incidentally, a difference between Dmax and Dmin becomes smaller because there are a few shadows of cellulose on the surface of a sheet like the recording paper C shown in FIG. 3 and FIG. 4. The above-described comparison operation is performed to decide the paper kind, that is, the surface roughness of a sheet.

Figure 6:
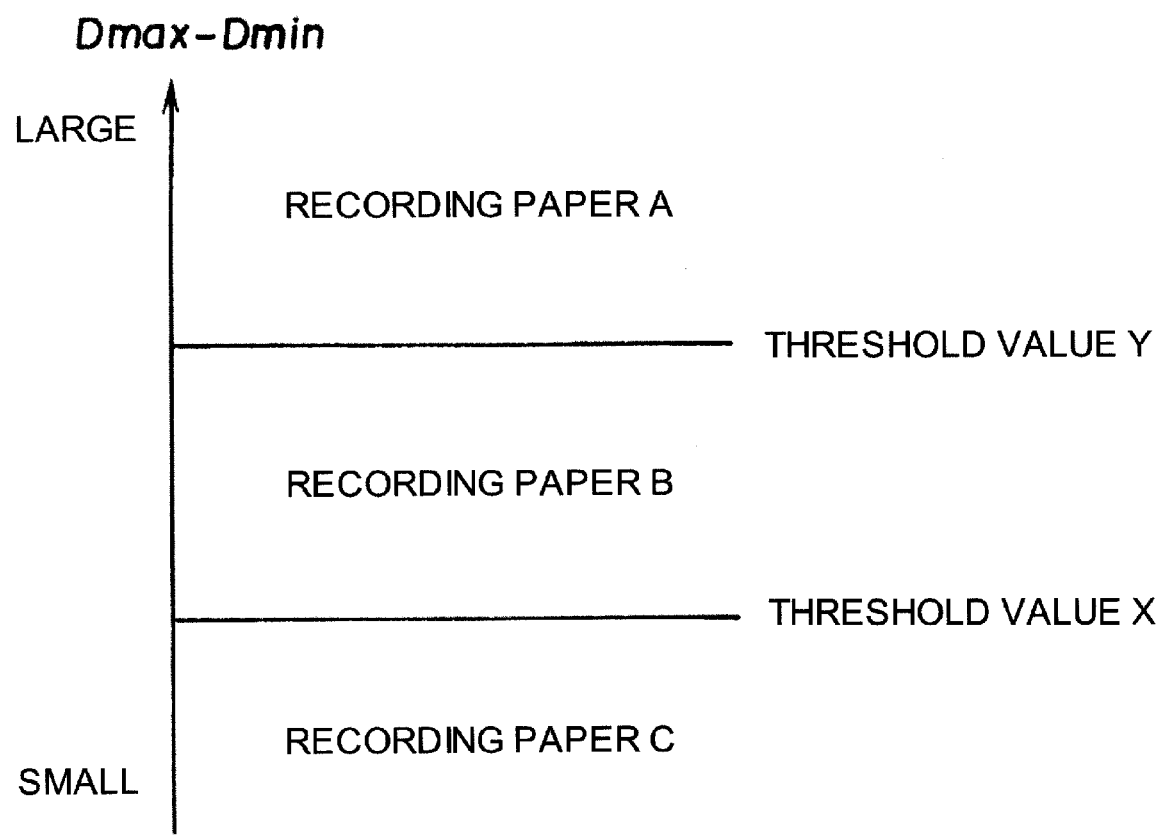
FIG. 6 is a schematic view showing thresholds according to which pieces of recording paper A, B, and C are decided.

FIG. 6 is a schematic view showing a technique for deciding the paper kinds of the recording paper A, B, and C according to subtracted values of Dmax−Dmin. In the above-described case, thresholds used as a standard for deciding paper kinds, for example, X and Y are stored in a nonvolatile memory in a DC controller beforehand. However, the thresholds are not limited to the above-described two values such as X and Y, and may be set at two or more values. The number of sheets, that is, three types of the recording paper A, B, and C are only an example for deciding the paper kind.

Accordingly, the sheet is decided as the recording paper A when the value of Dmax−Dmin is larger than the threshold Y, that is, Dmax−Dmin>Y. Similarly, the sheet is decided as the recording paper B when the value of Dmax−Dmin is smaller than the threshold Y, and larger than the threshold X, and the sheet is decided as the recording paper C when the value of Dmax−Dmin is smaller than the threshold X.

Figure 7:
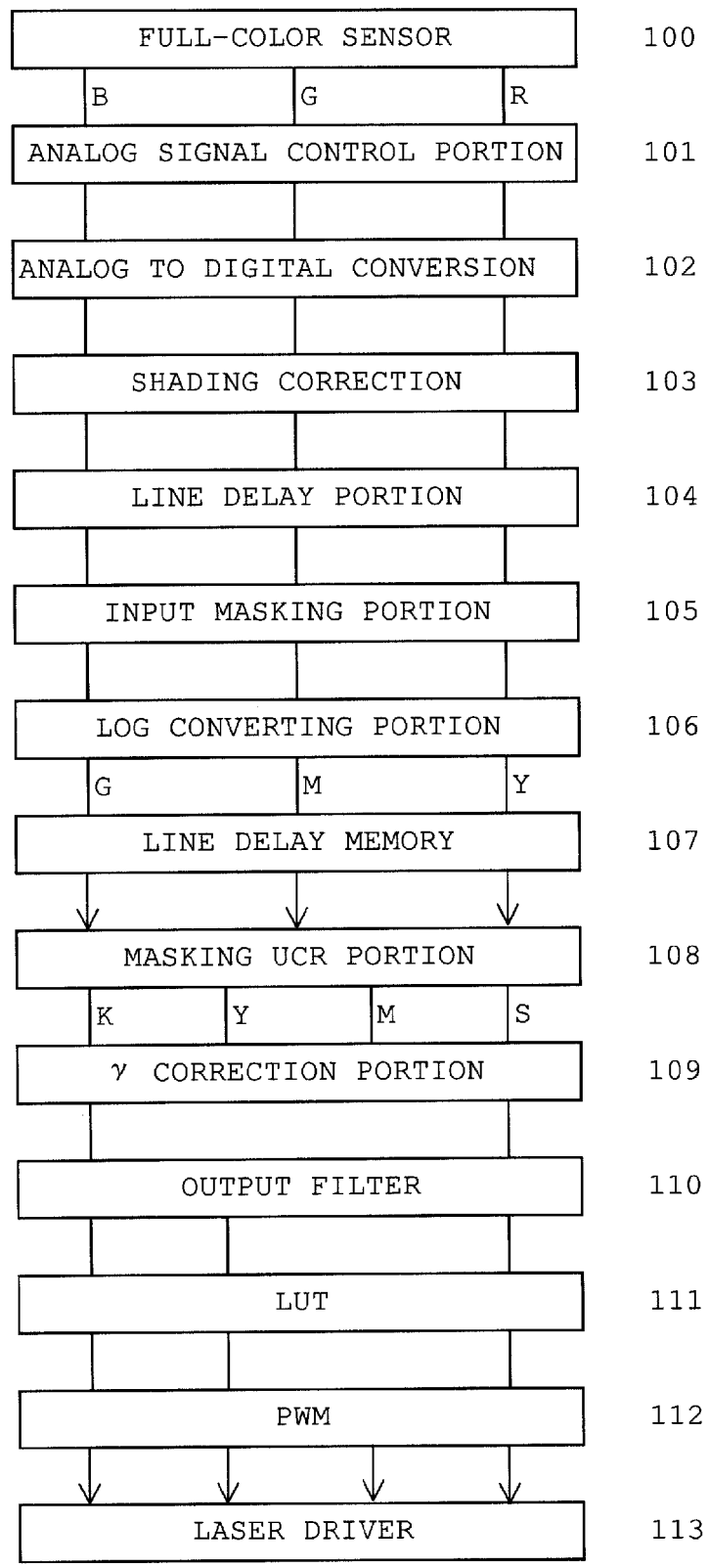
FIG. 7 is a functional diagram showing a configuration.

Then, as shown in a functional block diagram shown in FIG. 7, an image signal output from full-color sensor 100 is input to an analog signal processing portion 101 for adjustment of a gain and an offset. After the adjustment, the image signals are converted into RGB digital signals of, for example, eight bits (0 through 255 levels: 256 gradations) in an analog to digital converting portion 102 for each of color components. In a shading correction portion 103, a signal reading a standard white board (not-shown) is used for each color, and gains are optimized, corresponding to each of the CCD sensor cells, for shading correction in order to eliminate dispersions in sensitivity for each of cells in a sensor cell group including arranged CCDs.

A line delay portion 104 corrects a spatial displacement included in the image signal output from the shading correction portion 103. The above spatial displacement is caused because each of the line sensors in the full-color sensor 100 are arranged separated at a predetermined distance from one another in the sub-scanning direction. Specifically, line delay of each of color component signals of R (red) and of G (green) is performed in the sub-scanning direction with reference to a B (blue) color component signal, and the phases of the three color component signals are synchronized.

An input masking portion 105 converts a color space of the image signal output from the line delay portion 104 into an NTSC standard color space, using a matrix operation expression shown in FIG. 8. That is, the color space of each color component signal output from the full-color sensor 100 is converted into the NTSC standard color space, though the color space of each color component signal is decided by the spectral characteristics of the filters for each color component.

A lookup table (LUT) including, for example, ROMs and the like forms a LOG converting portion 106 converting an RGB brightness signal output from the input masking portion 105 into a CMY density signal. A line delay memory 107 delays the image signal output from the LOG converting portion 106 by a period (line delay) during which a black character determining portion (not shown) generates a control signal, such as UCR, FILTER, and SEN, by the output from the input masking portion 105.

A masking UCR portion 108 extracts a black component signal K from the image signal output from the line delay memory 107. Furthermore, the masking UCR portion 108 performs matrix operation for Y, M, C, and K, wherein color turbidities of the color recording materials in the printing portion are corrected in the portion 108, and color element image signals of, for example, eight bits are output in the order of M, C, Y, and K every reading operations in the reading portion 1R. Here, matrix coefficients used for matrix operation are set by a not shown CPU 200.

Moreover, a γ correction portion 109 performs density correction of the image signal output from the masking UCR portion 108 in order to match the image signal with an ideal gradation characteristics of the printing portion. An output filter (a spatial filter processing portion) 110 performs edge emphasis processing or smoothing processing for the image signal output from the γ correction portion 109, based on the control signal from a CPU.

An LUT (an adjusting means) 111 matches the density of an original image with that of an output image, and includes, for example, RAM and the like. The translation table is set by a CPU. A pulse width modulator (PWM) 112 outputs a pulse signal with a pulse width corresponding to the level of the input image signal, and the pulse signal is input to a laser driver 113 driving a semiconductor laser (a laser light source). The scanner 3 forms an electrostatic latent image by scanning exposure of the surface of the photosensitive drum 1 by laser light, based on the image signal input from the image reading portion 1R.

(Decision of a Recording Rate of Dark and Light Toners)

When it is decided that a sheet is corresponding to which of the recording paper A, B, and C, "recording rates Rn and Rt" are decided, which may be paraphrased as a mixing (allocation) rate of dark toners and light toners adaptable to the sheet paper kinds, that is, a toner dot forming rate, and the above-described decision is made for both magenta and cyan.

Figure 9:
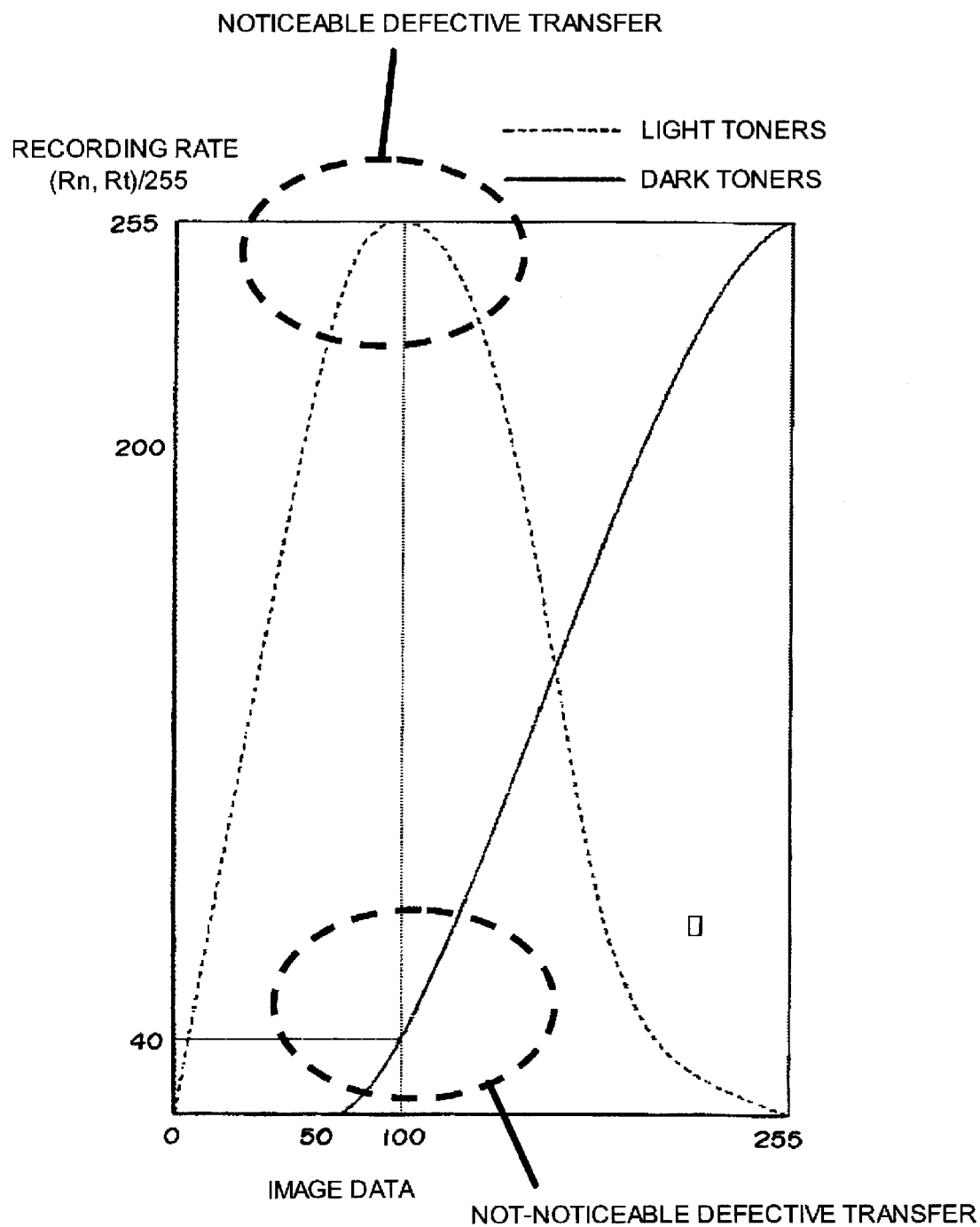
FIG. 9 shows characteristic curves representing recording rates of dark toners and light toners.

FIG. 9 shows characteristic curves determining recording rates of dark and light toner for dark toners denoted by a solid-line curve, and light toners denoted by a dashed-line curve. Based on a color component image signal Data of eight bits, which is data for the cyan component and the magenta component, recording rates Rn and Rt are decided for dark toners and light toners, respectively. It is possible to interpret that the recording rate represents a quantity of formed dots, a larger rate shows high density, and a smaller rate shows low density.

When input gradation data is, for example, 100/255, it is decided that a recording rate Rt for light toners is 255/255, and a recording rate Rn for dark toners is 40/255. Here, the recording rate is represented by an absolute value, assuming that 255 represents 100 percents.

Moreover, the following is found from FIG. 9. Defective transfer is easily and noticeably caused by the effect of the surface roughness of a sheet at a location in which the placed toner quantity is large for light toners, and the location stands out. On the other hand, defective transfer is hardly caused at a location in which the placed toner quantity is small for dark toners. Accordingly, in order to reproduce a low density portion, it is preferable to raise the recording rate for dark toners. Then, based on the color component image signal Data, the recording rates Rn and Rt are changed according to the recording paper A, B, and C.

Figure 10:
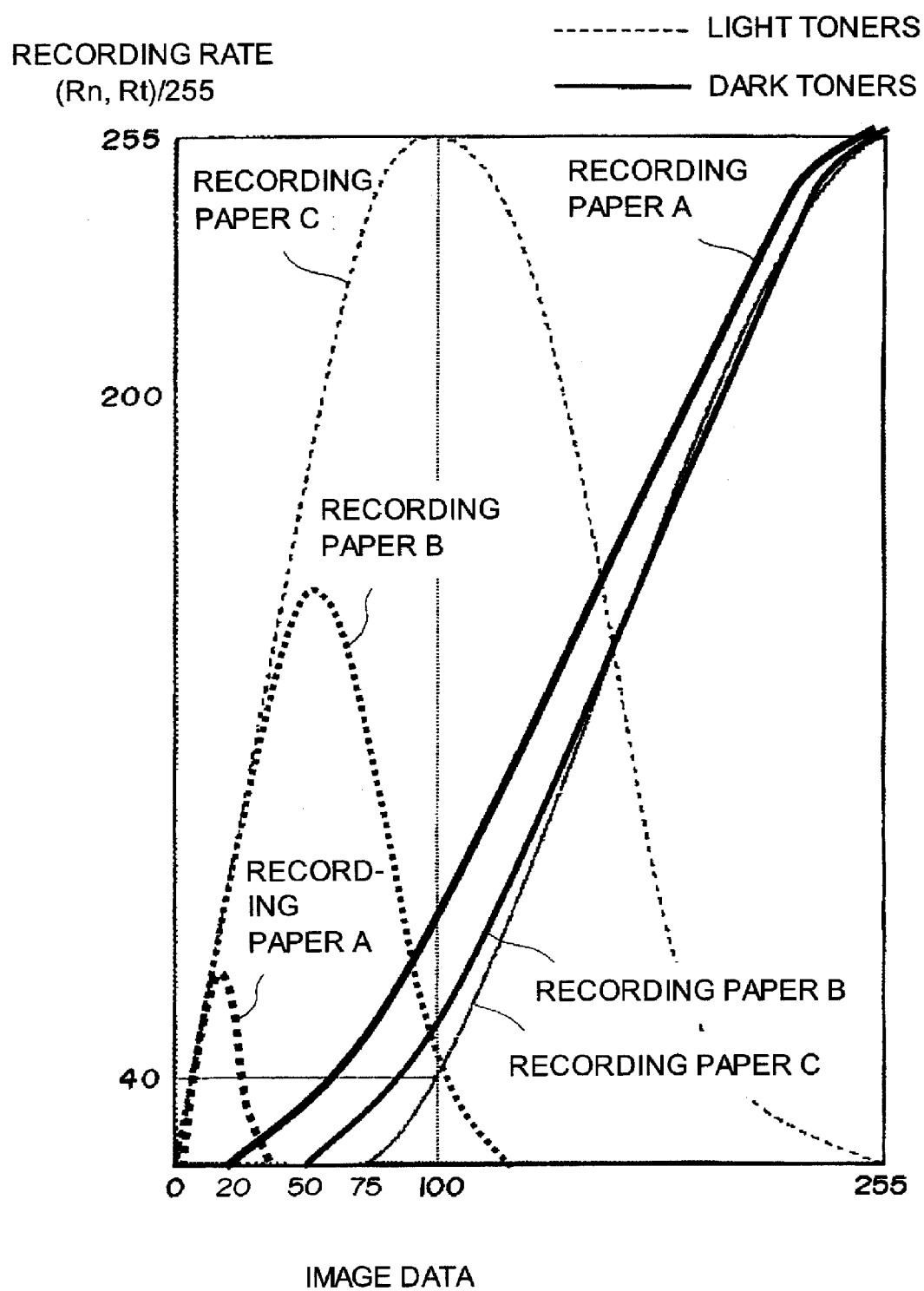
FIG. 10 is characteristic curves determining recording rates of dark and light toners.

When it is found from the result of the above-described determination that the sheet 30 is corresponding to, for example, the recording paper A, the recording rates for the light toners and the dark toners are changed to be adaptable to the recording paper A, as shown in FIG. 10. The reason is that, as the paper cellulose on the surface is coarse, and a lot of cellulose shadows are generated in the case of the recording paper A as shown in FIG. 3 and FIG. 4, there is a great difference between the bright locations and the dark locations, and the difference between highest pixel density Dmax and lowest pixel density Dmin becomes larger. Similarly, the recording rates are set at a value between those for the recording paper A and B when it is found from the result of the above-described determination that the sheet 30 is corresponding to the recording paper B.

Conditions in which the recording rates for the light toners and the dark toners are changed as shown in FIG. 10 will be described in detail. As shown in FIG. 10, a use quantity of dark toners is increased as image data for a toner image to be formed is increased. In the present example, the density of a toner image with the lowest density among toner images formed by using dark toners is changed according to the surface roughness of the sheet. That is, a toner image with the lowest density among toner images formed by using dark toners and light toners is changed by the surface roughness of the sheet. When the sheet is corresponding to the recording paper A as shown in FIG. 10, dark toners are used for from image data 20 through 255. When the sheet is corresponding to the recording paper B, dark toners are used for image data within a range of 50 through 255. Moreover, when the sheet is corresponding to the recording paper C, dark toners are used for image data within a range of 75 through 255.

According to the present embodiment, the recording rates for light toners and dark toners with regard to magenta and cyan are changed according to kinds such as the surface roughness and the like of the sheet 30 as described above, wherein the surface roughness are represented by the recording paper A, B, and C. Thereby, a high-quality image without image unevenness may be formed according to the sheet kinds.

In the image forming apparatus according to the present embodiment, a pattern generator (not shown) may be installed for registration of gradation patterns, and a signal may be directly transmitted to a pulse width modulator 62.

Figure 11:
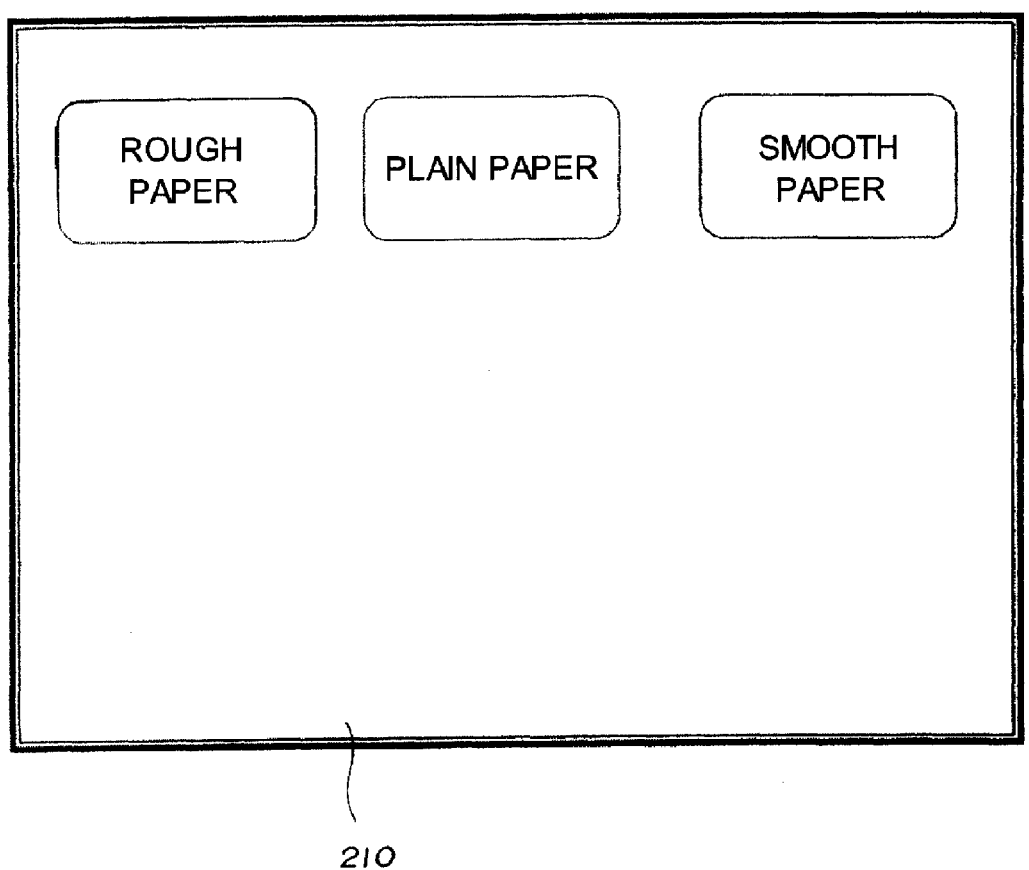
FIG. 11 is a view showing an operation panel.

In the present example, the surface roughness of a sheet has been detected by the sheet reading and detecting portion 123. However, it is also possible to adjust the image controlling method according to the surface roughness of a sheet to be used which is input by a user through an operation panel 210 as shown in FIG. 11.

Moreover, the present example has described the device in which, once a toner image formed on the photosensitive drum 1 is transferred onto the intermediate transfer belt, the toner image is transferred onto a sheet. However, the present invention may be also applied to an image forming apparatus in which a toner image formed on the photosensitive drum 1 is transferred directly to a sheet.

Second Embodiment

According to a second embodiment, a content ratio between dark toners and light toners is changed according to sheet kinds (surface roughness) in a similar manner to that of the first embodiment, and, furthermore, the resolution in a low density portion is reduced according to sheet kinds (surface roughness) in an image forming apparatus having a similar configuration to that according to the first embodiment.

Details will be described hereinafter, but only different points in the configuration and in the control from those of the first embodiment will be described. The reason is that the configuration and operations of the main body are similar to those of the first embodiment.

Usually, there are instabilities in electrostatic latent images, and unstable factors generated by the above instabilities in low density portions. Furthermore, there are unstable factors in processing during which a toner image is transferred onto the sheet 30. In order to eliminate the above unstable factors for improvement, it is effective for suppression of influences caused by the surface state and the like of a sheet to reduce the resolution in a low density portions.

Figure 12A:
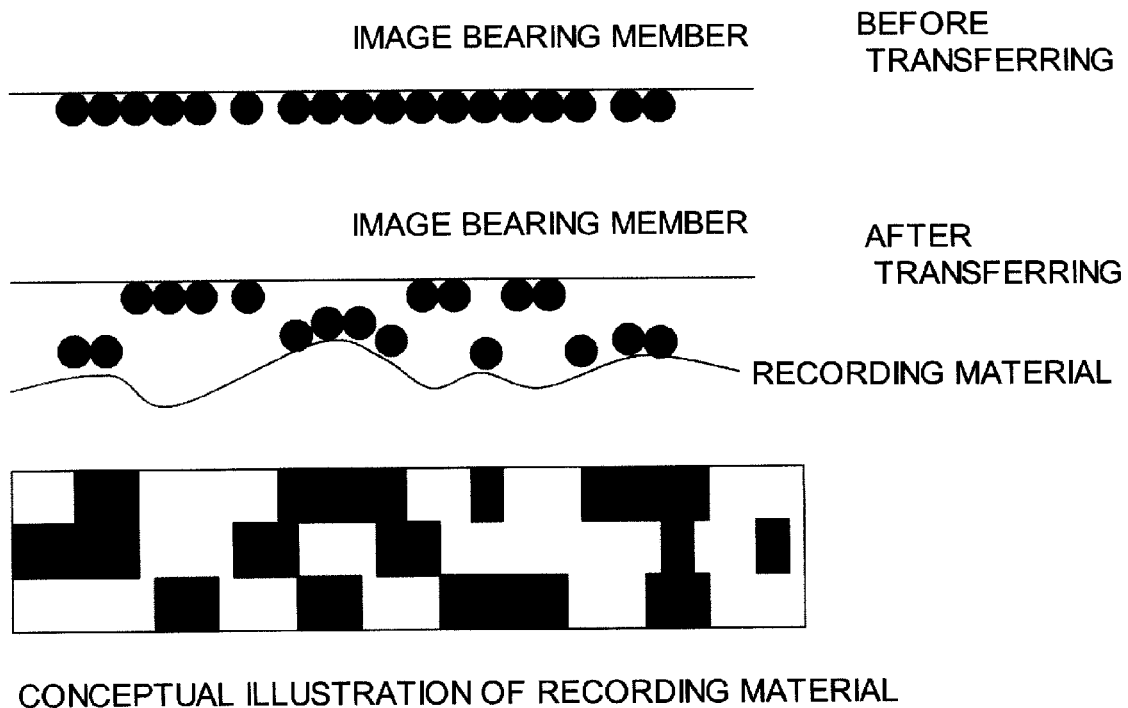
FIG. 12A is a view showing image unevenness in a case a processing for reducing a line number is not performed before and after the toner image is transferred from a photosensitive drum to a sheet in a second embodiment according to the invention.
Figure 12B:
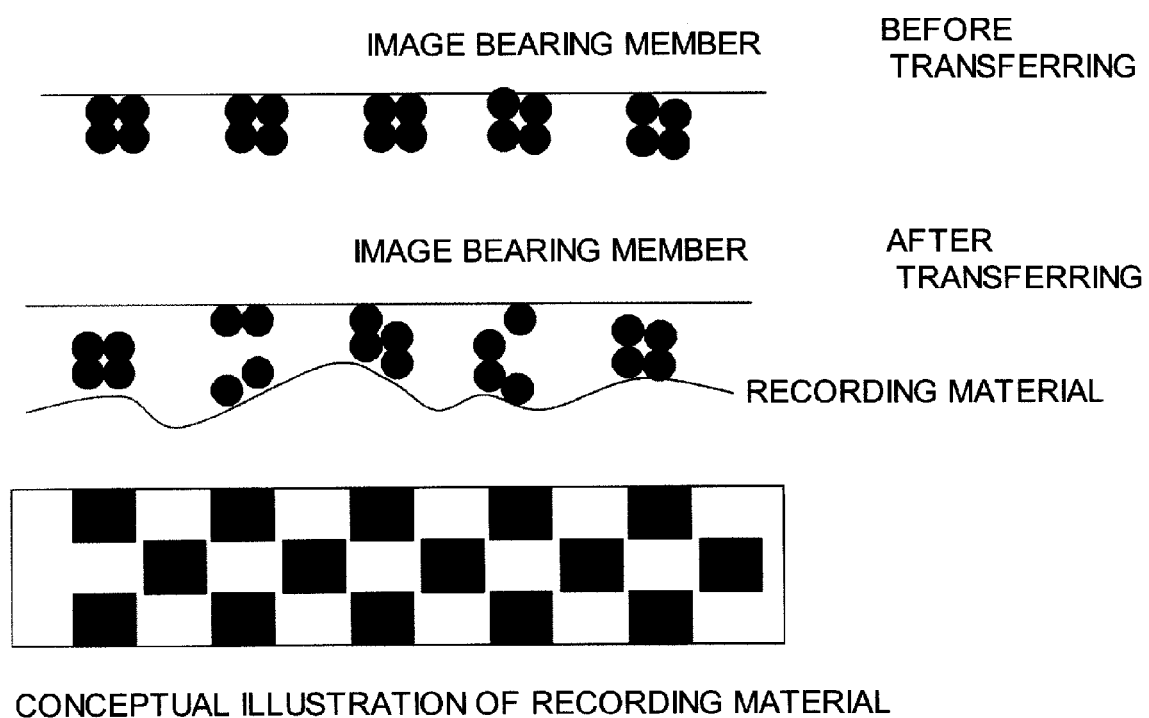
FIG. 12B is a view showing image unevenness in a case a processing for reducing a line number is not performed before and after the toner image is transferred from the photosensitive drum to a sheet in the second embodiment according to the invention.

FIG. 12A and FIG. 12B are a schematic view showing states in which, when sheet paper kinds are expressed by the rugged state of a sheet surface, that is, "surface roughness", transferring of a toner image formed on the image bearing member such as the photosensitive drum 1 onto a sheet is influenced by the surface roughness of a sheet.

In FIG. 12A, a toner image before transferring is formed in a uniform thin layer on the image bearing member. But, a well-transferred state is not obtained after transferring because electric discharge is generated in concave portions caused by the surface roughness of the sheet at electrostatic transferring. Thereby, image defectives are caused by transferring unevenness (image unevenness) according to degrees of the surface roughness of the sheet. On the other hand, as shown in FIG. 12B, an image is formed with less influences by the surface roughness of the sheet when a toner image before transferring is concentrated (the number of lines is reduced) in a massive state on the image bearing member. Thereby, there may be reproduced low density portions with regularity schematically expressed in a checkered pattern, and image defectives caused by transferring unevenness are prevented.

Figure 5:
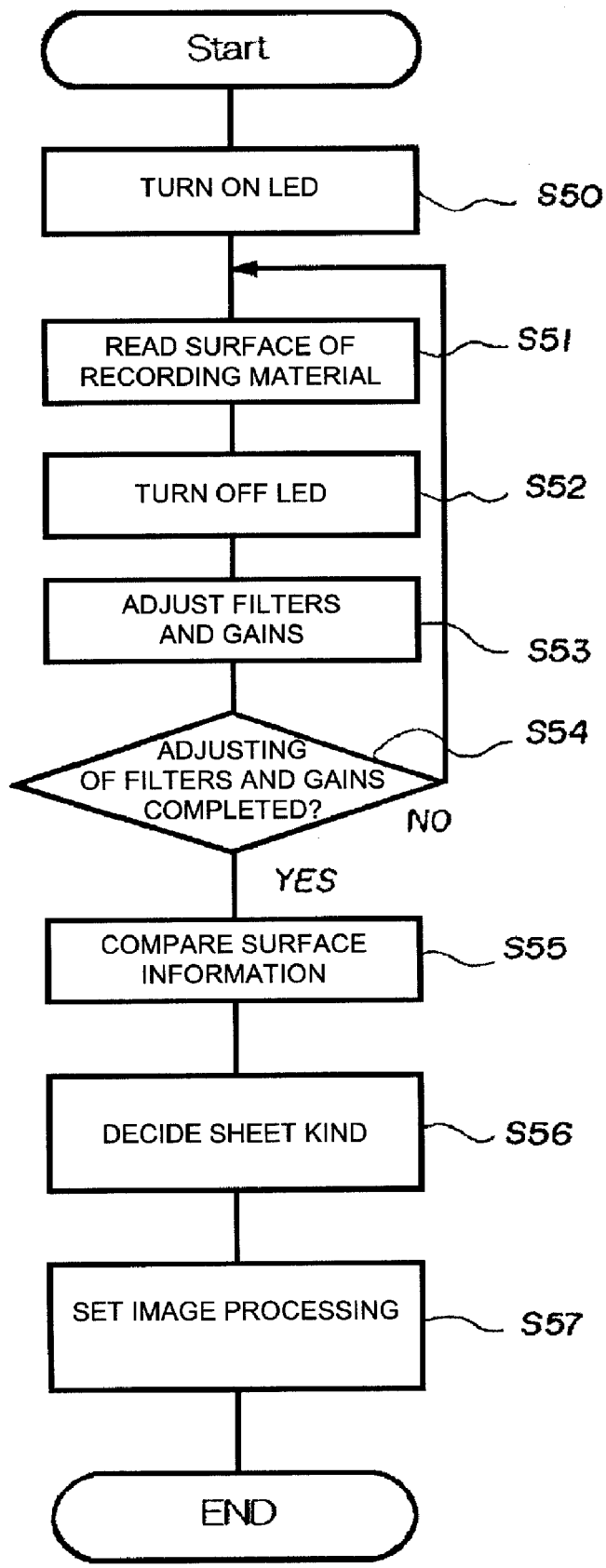
FIG. 5 is a flow diagram showing a series of operations of from image processing to sheet type decision.

When the kind of a sheet is decided according to the flow diagram shown in FIG. 5, the pulse width modulator (resolution changing means) 112 shown in the block diagram of FIG. 7 changes the number of lines of a toner image of image data 100 or less according to the kinds of a sheet (surface roughness), that is, the resolution in the direction of the rotation axis of the photosensitive drum 1 according to the kinds of a sheet (surface roughness). In a low density portion of image data 100 or less, resolution at use of a sheet corresponding to the recording paper A with a rough surface is reduced in comparison with the number of lines (resolution) at use of a sheet corresponding to the recording paper C with a smooth surface). At this time, the number of lines for an image exceeding image data 100 is 200 regardless of the kind of a sheet.

The number of lines are changed as shown in Table 1. Here, [lpi] in Table 1 is a number of lines per one inch.

TABLE 1

| Sheet Kind | Number of Lines [lpi] |
| --- | --- |
| Recording Material A | 130 |
| Recording Material B | 170 |
| Recording Material C | 200 |

Though the image forming apparatuses according to several embodiments of the present invention has been described above, the invention is not limited to the above-described embodiments, and other embodiments, various kinds of applications, modifications, and combinations thereof may be applied without departing from the scope of the invention.

It has been described in the embodiments that best image adjustment is performed by adjusting recording rates of dark and light toners using magenta toners and cyan toners, assuming that the present invention is applied to a color-image forming apparatus. But, similar advantages may be obtained even when light toners are applied to gray-colored toners, and dark toners are applied to black-colored toners.

This application claims the benefit of priority from the prior Japanese Patent Application No. 2006-268291 filed on Sep. 29, 2006 the entire contents of which are incorporated by reference herein.

What is claimed is:

1. An image forming apparatus, comprising:
    an image bearing member;
    an image forming means which forms images by using light toners and dark toners which have a same hue as that of the light toners and are darker than the light toners; and
    an executing portion which executes a first mode, in a case that a surface of a recording medium is rough, to form an image by using a predetermined condition between a ratio of dark toner quantity to light toner quantity and a density of input image data,
    wherein, in a case that the first mode is executed, a resolution for a density of pixels is set so that in a first area where the density of input image data is higher than a predetermined value, the image is formed with a first resolution for a density of pixels in the first area, and in a second area where the density of input image data is lower than the predetermined value, the image is formed with a second resolution for the density of pixels in the second area,
    wherein the second resolution is lower than the first resolution.

2. The image forming apparatus according to claim 1, wherein an executing portion executes a second mode, in a case that the surface of the recording medium is smooth, to form an image by using the predetermined condition between a ratio of dark toner quantity to light toner quantity and a density of input image data,
    wherein, in a case that the second mode is chosen, a resolution for a density of pixels is set so that in a third area where the density of input image data is higher than the predetermined value, the image is formed with the first resolution for a density of pixels in the third area, and in a fourth area where the density of input image data is lower than the predetermined value, the image is also formed with the first resolution for the density of pixels in the fourth area.

3. The image forming apparatus according to claim 1, wherein the pixels are disposed in lines and the density of pixels is counted by a number of lines.

* * * * *